United States Patent [19]
Bedouet

[11] Patent Number: 6,097,584
[45] Date of Patent: Aug. 1, 2000

[54] RESERVE D.C. POWER DEVICE

[75] Inventor: Bernard Bedouet, Bourg les Valence, France

[73] Assignee: Sextant Avionique, Velizy Villacoublay, France

[21] Appl. No.: 09/235,481

[22] Filed: Jan. 22, 1999

[30] Foreign Application Priority Data

Jan. 27, 1998 [FR] France ................................ 98 00851

[51] Int. Cl.$^7$ ........................................... H01G 2/00
[52] U.S. Cl. ...................... 361/93.1; 361/93.9; 361/104; 361/272
[58] Field of Search ................... 361/93.1, 93.8, 361/93.9, 103, 104, 58, 102, 272, 275.1, 275.5; 340/652, 653; 307/109, 110; 320/7, 13

[56] References Cited

U.S. PATENT DOCUMENTS

| | | | |
|---|---|---|---|
| 4,703,195 | 10/1987 | Bailey | 307/147 |
| 5,073,751 | 12/1991 | Kaitandjian et al. | 320/1 |

FOREIGN PATENT DOCUMENTS 0 341 159 A1  11/1989  European Pat. Off. .

WO 92/20082  11/1992  WIPO .

OTHER PUBLICATIONS

Patent Abstracts of Japan, vol. 18, No. 595 (E–1630), Nov. 14, 1994, and JP 06 225447 A, Aug. 12, 1994.
Derwent Abstracts, Accession No. 89–269282, SU 1 465 930 A, Mar. 15, 1989.

*Primary Examiner*—Michael J. Sherry
*Attorney, Agent, or Firm*—Oblon, Spivak, McClelland, Maier & Neustadt, P.C.

[57] ABSTRACT

The disclosure relates to the securing of a reserve d.c. power device containing a battery of parallel-connected electrolytic capacitors. A reserve d.c. power device is provided with current limitation means series-connected at its input and current cut-off means that are series-connected with each capacitor and that open for a current intensity value higher than the value of intensity of the nominal current for charging the protected capacitor that is imposed by the distribution, between the capacitors, of the current with intensity limited by the means of limiting current delivered by the d.c. source each time that the system is started up. Precautions are thus taken against power supply losses due to the short-circuiting of a capacitor. At the same time, it is seen to it that the state of the capacitors of the power reserve device is constantly monitored.

5 Claims, 2 Drawing Sheets

RESERVE D.C. POWER DEVICE

BACKGROUND OF THE INVENTION

1. Field of the Invention

The present invention relates to a capacitor-based reserve d.c. power device that can be used to mask short-lived power cuts in a d.c. power supply network for electronic modules.

2. Description of the Prior Art

One of the possible applications of a reserve d.c. power device is the supply of direct current to items of equipment on board an aircraft. Direct current power supply systems on board aircraft undergo cutoffs lasting some microseconds to some tens of milliseconds. These power cutoffs are caused by the starting up of devices that are heavy consumers of power, for example electrical motors or by a transfer from one power source to another by means of electromechanical switching devices. These power cutoffs can be detrimental to the efficient working of electronic equipment, should they reach this equipment. To avert this possibility, it is common practice to use power reserve devices based on electrolytic capacitors. These power reserve devices are positioned immediately upline from the electronic devices. They take over the role of the power supply system during the micro-cutoffs.

These power reserve devices raise problems of dependability owing to the possible breakdown of their capacitors, which may get short-circuited or pass into an state of open circuit. Malfunctioning through the short-circuiting of an electrolytic capacitor of a power reserve device is easy to detect because it causes the electronic equipment that is being powered to become unavailable. The probability of this malfunction is about $0.5 \ 10^{31 \ 6}$ per capacitor. The malfunctioning that occurs when the electrolytic capacitor of a power reserve device goes into a state of open circuit is more subtle for it is apparent only in a deterioration of the time during which the cutoffs are masked. Its probability too is in the range of $0.5 \ 10^{31 \ 6}$ per capacitor.

SUMMARY OF THE INVENTION

The present invention is aimed at making a reserve d.c. power device that tolerates malfunctions in its capacitors and at preventing the short-circuiting of one of its capacitors from resulting in the unavailability of the electronic equipment. It is also aimed at facilitating the detection of open-circuit or short-circuit type malfunctions that may affect the capacitors of a power reserve device so that the malfunctioning capacitor can be reported as early as possible with a view to its replacement.

An object of the invention is a power reserve device interposed between at least one d.c. current source and a load and provided with a battery of parallel-connected capacitors comprising current limitation means series-connected at its input and current cut-off means that are series-connected with each capacitor and that open for a current intensity value higher than the value of intensity of the nominal current for charging the protected capacitor that is imposed by the means of limiting current delivered by the d.c. source each time that the system is started up.

Advantageously, the current cut-off means series-connected with each capacitor of the power reserve device are each provided with a circuit to report their open or closed state.

Advantageously, the reserve d.c. power device comprises means to test the intensity of the electrical current series-connected with each capacitor and control means to make sure that the testing means detect a current whenever the d.c. current source is started up.

Advantageously, the means for testing the intensity of the current that flows through each capacitor of the d.c. current power reserve device and the circuits for reporting the states of the cut-off means series-connected with each capacitor of the power reserve device are connected to the inputs of a maintenance unit that stores their states whenever the d.c. source is started up.

According to a particular embodiment, the current cut-off means series-connected with each capacitor of the power reserve device are fuses.

According to a particular embodiment, the current cut-off means series-connected with each capacitor of the power reserve device are circuit-breakers.

BRIEF DESCRIPTION OF THE DRAWINGS

Other characteristics and advantages of the invention shall appear here below from the following description of an embodiment given by way of an example. This description will be made with reference to the appended drawings of which:

In these figures, identical elements are identified by the same references.

FIG. 1 shows a standard reserve d.c. power device 1 interposed between, firstly, a double power distribution mains system supplied by two parallel-connected d.c. power sources 2, 3 and, secondly, d.c.—d.c. voltage converters for which electronic modules 5 constitute the loads.

Figure 1:
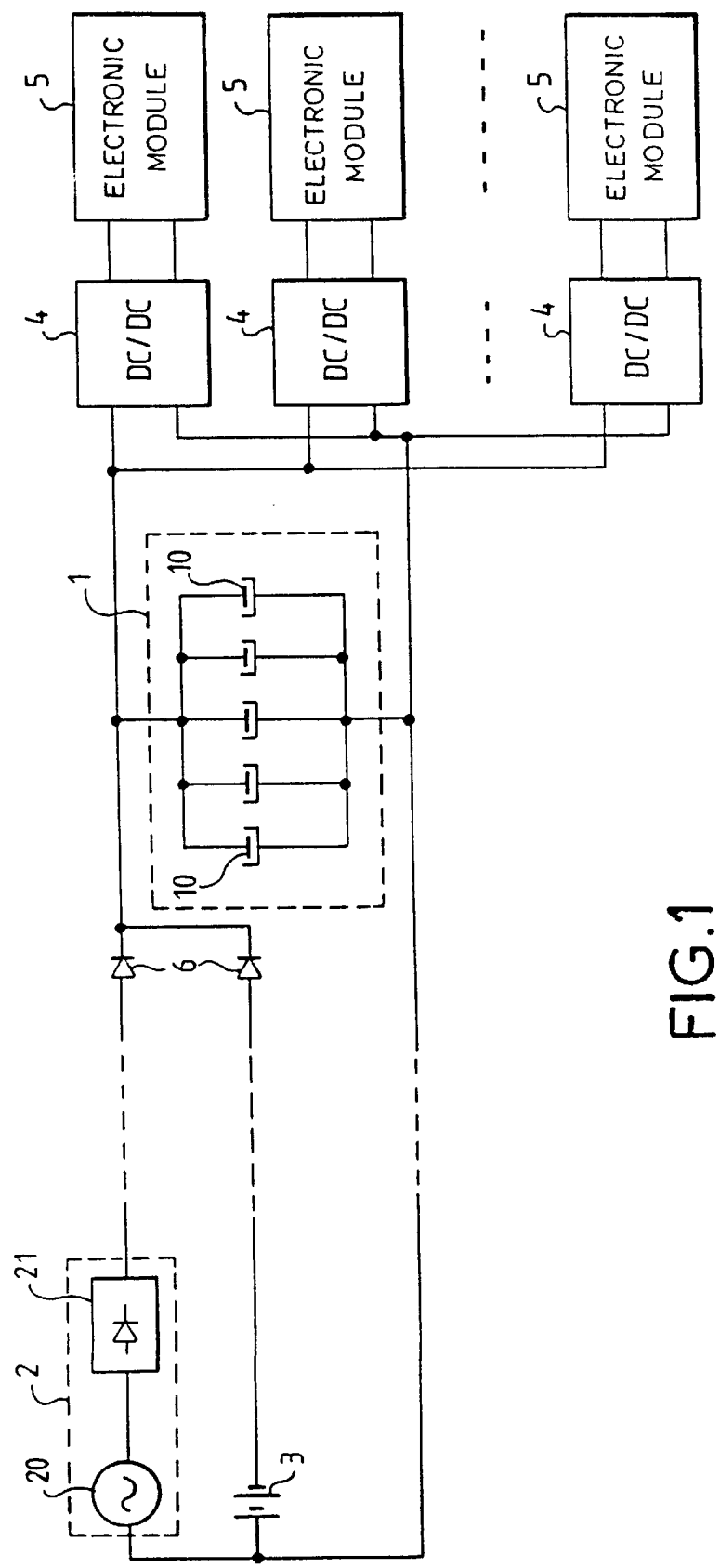
FIG. 1 is a drawing of a reserve d.c. power device according to the prior art, interposed between d.c. current sources and loads constituted by d.c.—d.c. voltage converters supplying power to electronic modules.

The reserve d.c. power device 1 is simply constituted, as is well known, by a battery of electrolytic capacitors 10 parallel-connected between the two poles of the double d.c. power distribution mains system. This figure shows five parallel-connected electrolytic capacitors. For example, four of them provide the nominal value of the time for masking the micro-cutoff and a fifth electrolytic capacitor is redundant. In practice, provision is made for the connection of n electrolytic capacitors in parallel in order to obtain the nominal value required by the desired micro-cutoff masking time and for one or more additional electrolytic capacitors to ensure redundancy in the event of malfunctioning through the passage of one or more capacitors into a state of open circuit.

The two d.c. power sources 2 and 3 are for example an alternating current generator 20 followed by a current rectifier circuit 21 and a battery of standby accumulators 3 whose outputs are connected to the input of the reserve d.c. power device by means of a double power distribution mains system and a branching with no-return diodes 6 that prevents the reserve d.c. power device from resupplying power to the double electrical power distribution mains system.

The reserve d.c. power device 1 is placed with the d.c.—d.c. voltage converters 4 as close as possible to the powered electronic modules. For example, it is placed in the housing rack of these electronic modules whereas the d.c. power sources 2 and 3 are distant and connected by means of the double d.c. power distribution mains system. The presence of the reserve d.c. power device 1 in the vicinity of the electronic modules 5 is warranted by the existence de micro-cutoffs in the distribution mains. These micro-cutoffs are caused either by the starting up of heavy power-consuming loads, for example electrical motors, connected to the double power distribution mains or by mechanical switching operations at the d.c. power sources that supply power to the double power distribution mains system.

The presence of the electrolytic capacitors 10 in the reserve d.c. power device raises the problem of their reliability. Indeed, these capacitors may be subject to malfunctions that arise either through their being short-circuited or through their being placed in a state of open circuit.

The case where a capacitor of the reserve d.c. power device malfunctions because it has been short-circuited is easily detectable and, at the same time, unacceptable as it stops the supply of direct current to the electronic modules 5. It occurs at a probability of $0.5 \ 10^{-6}$ approximately per capacitor.

The case where the capacitor of the reserve d.c. power device malfunctions because it has passed into a state of open circuit is harder to detect since it can be perceived only through a deterioration of the micro-cutoff masking time. It occurs also with a probability of $0.5 \ 10^{-6}$ approximately per capacitor. It is the usual practice to take steps to avert the consequences of such a malfunction for the electronic modules 5 by providing the battery of capacitors with one or more redundant elements.

Figure 2:
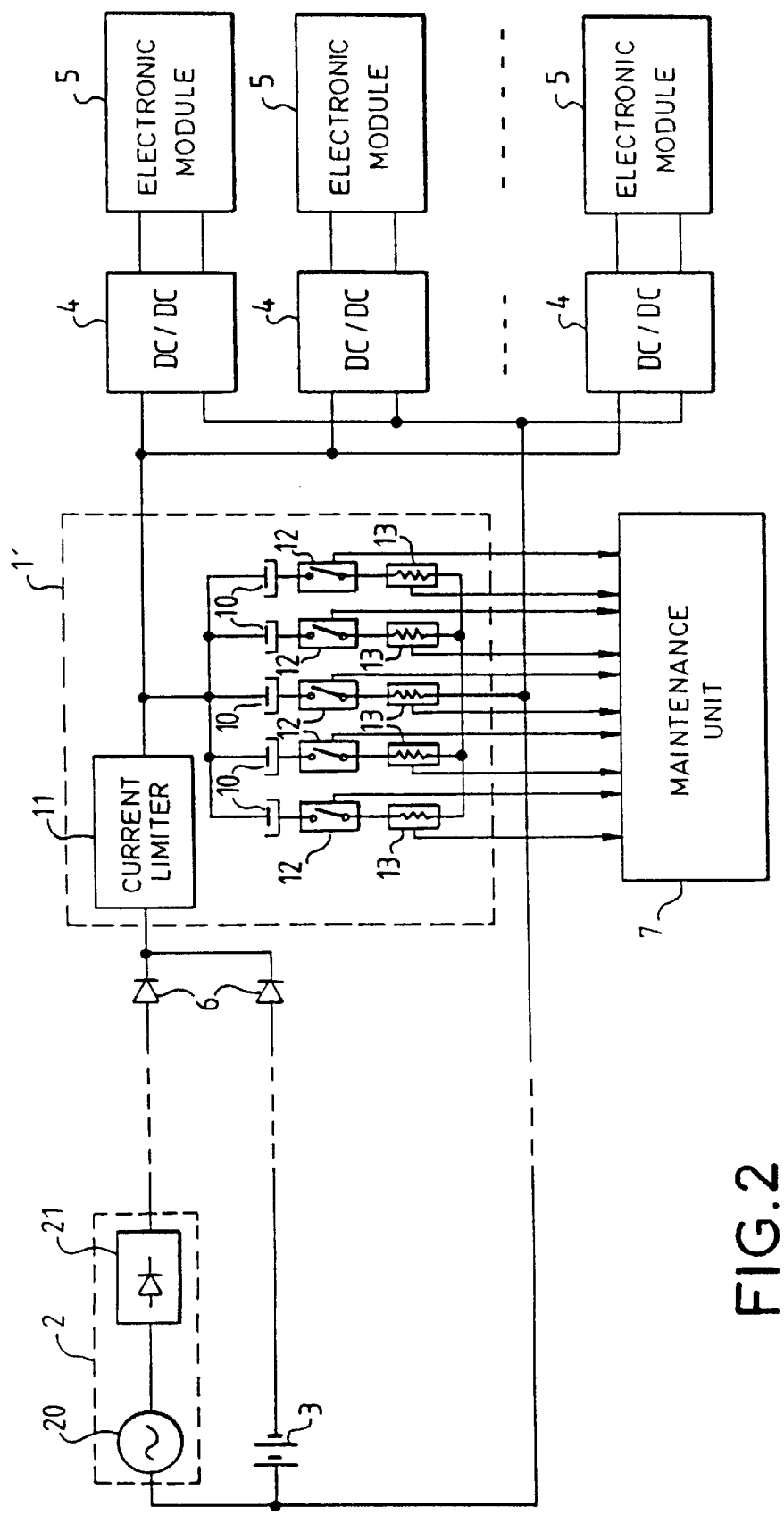
FIG. 2 is a drawing of an electrical power reserve device according to the invention, interposed as in the above-mentioned drawing between d.c. current sources and loads constituted by d.c.—d.c. voltage converters supplying power to electronic modules.

It is not satisfactory that a malfunction of a capacitor of the reserve d.c. power device should suddenly cause a stoppage of the electrical power supply to the electronic modules. Nor is it satisfactory that this malfunction should go unperceived while at the same time causing a deterioration of performance characteristics liable to cause intermittent failures in electronic modules. To prevent this, it is proposed to modify the structure of the reserve d.c. power device according to FIG. 2. In addition to the battery of capacitors 10, this device, referenced 1', receives a current limiter 11 placed at its input as well as a series assembly at the terminals of each capacitor 10. This series assembly comprises a circuit-breaker 12 with signalling and a current measurement circuit 13 whose signalling outputs are connected to a maintenance unit 7.

The current limiter 11 is not necessarily placed at the input of the reserve d.c. power device. It may be placed much further upline in the electrical power distribution mains system. It may for example be split up into two and placed at the sorties of each power source 2, 3. Its function, at each time that the supply sources 2 or 3 are put into operation, is to lay down a limitation of the intensity values of the currents for charging the capacitors 10 of the reserve d.c. power device so that these values of intensity will always be lower than those of the short-circuit currents at any one of the capacitors. Indeed, in the event of a short-circuit in one of the capacitors 10, an excess current flows in the short-circuited capacitor. This excess current is due to the addition of the current from the source powering the distribution mains and of the currents for discharging the other healthy capacitors. Through this limiter 11, it is then possible to set the circuit-breaker 12 so that it opens at a value of current intensity higher than the values of intensity for charging and discharging each capacitor 10 during normal operation and lower than the value of intensity of the short-circuit current.

The circuit-breakers 12, which may be fuses with signalling or electromechanical or electronic circuit-breakers with signalling open under a short-circuit current and remain open until action by maintenance personnel.

The current measurement circuits 13 measure the intensity of the instantaneous current flowing through each capacitor and send the results of their measurements to the maintenance unit 7. This unit may comprise a memory circuit at inputs. It periodically tests the signalling states of the circuit-breaker 12 to report any capacitor 10 in a short-circuited state and ascertain that no capacitor is in the open state by testing for the presence, through the signals of the current measurement circuits 13, of non-zero currents at the terminals of each capacitor to be started up in the d.c. power supply network.

The usefulness of the secured reserve d.c. power device that has just been described can clearly be seen from a study of the probabilities of loss of power supply upline from the d.c.—d.c. electrical voltage converters of the electronic modules.

With an unsecured reserve d.c. power device of the prior art comprising a battery of ten parallel-connected electrolytic capacitors supplied by a double power distribution mains system, the probability of loss for the two distribution mains systems may be estimated at about $10^{-10}$ and that of loss for the reserve device at about $10^{-5}$, so that the probability of a breakdown in power supply is over $10^{-5}$.

With the same reserve d.c. power device secured by the implementation of a current limiter, circuit-breaker and an eleventh electrolytic capacitor, the probability of a breakdown of the double power distribution mains system remains in the range of $10^{-10}$ while that of the reserve d.c. power device goes to about $10^{31 \ 10}$. This leads to a probability of power breakdown of about $2.10^{-10}$, which is appreciably lower than the previous case.

What is claimed is:

1. A power reserve device interposed between at least one d.c. current source and a load and provided with a battery of parallel-connected capacitors, wherein said device comprises current limitation means series-connected at its input and current cut-off means that are series-connected with each capacitor and that open for a current intensity value higher than the value of intensity of the nominal charging current of the protected capacitor that is imposed by the means of limiting current delivered by the d.c. source each time that the system is started up.

2. A device according to claim 1, wherein said current cut-off means series-connected with each capacitor of the power reserve device are each provided with a circuit to signal their open or closed state.

3. A device according to claim 1, further comprising means to test the intensity of the electrical current, these means being series-connected with each capacitor, and control means to ensure that the testing means detect a current whenever the d.c. current source is started up.

4. A device according to claim 1, wherein the current cut-off means series-connected with each capacitor of the power reserve device are fuses.

5. A device according to claim 1, wherein the current cut-off means series-connected with each capacitor of the power reserve device are circuit-breakers.

* * * * *